Figure 1:
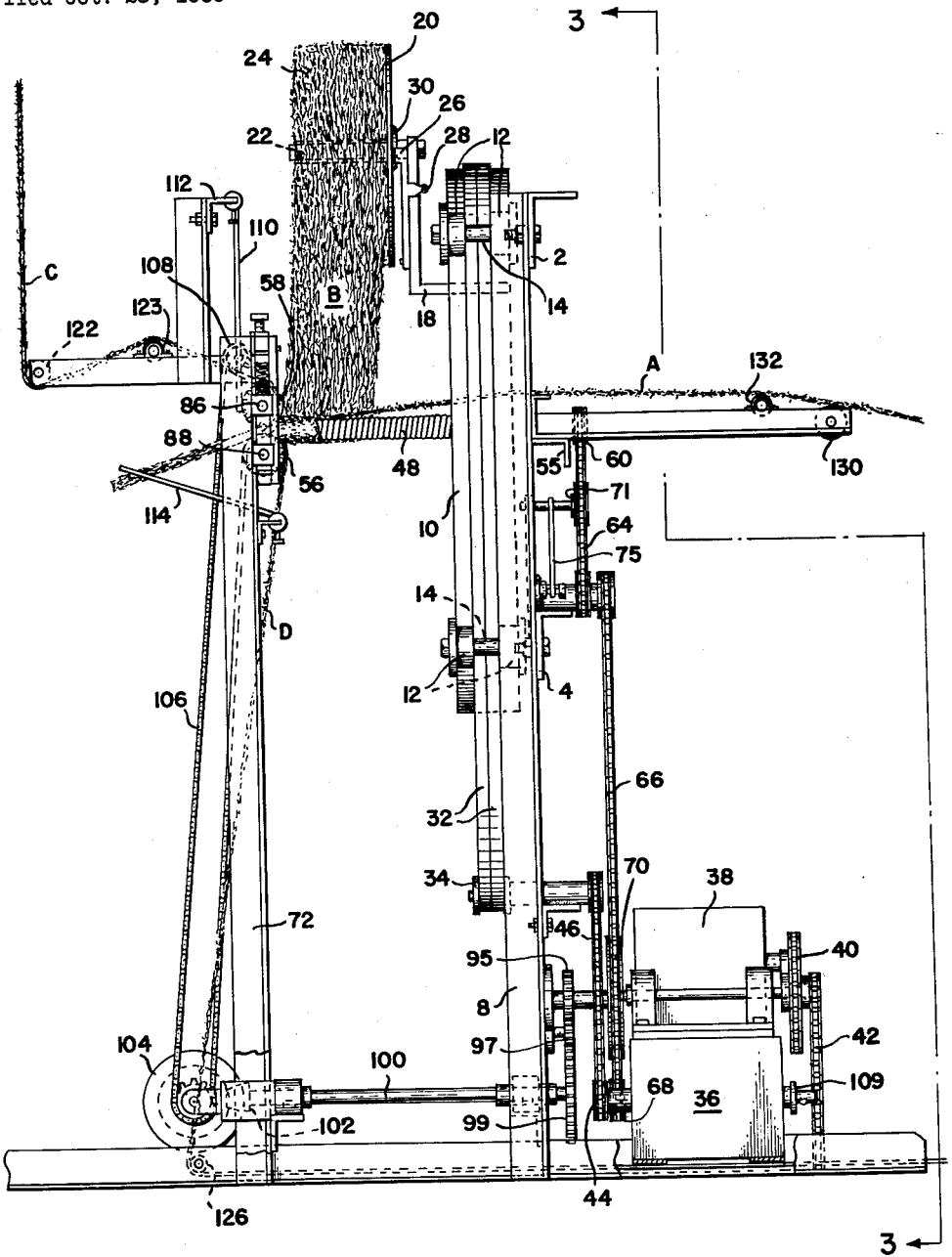

Dec. 3, 1963   J. W. WEBER   3,113,001
INSULATING BLANKET
Filed Oct. 28, 1959   5 Sheets-Sheet 1

INVENTOR.
JOHN W. WEBER
BY
ATTORNEYS

INVENTOR.
JOHN W. WEBER
BY
ATTORNEYS

Dec. 3, 1963  J. W. WEBER  3,113,001
INSULATING BLANKET

Filed Oct. 28, 1959  5 Sheets-Sheet 4

INVENTOR.
JOHN W. WEBER
BY
ATTORNEYS

Dec. 3, 1963  J. W. WEBER  3,113,001
INSULATING BLANKET
Filed Oct. 28, 1959  5 Sheets-Sheet 5

INVENTOR.
JOHN W. WEBER
BY
Busser, Smith & Hardy
ATTORNEYS

United States Patent Office 3,113,001
Patented Dec. 3, 1963

3,113,001
INSULATING BLANKET
John W. Weber, % American Asbestos Textile Corp., P.O. Box 228, Stanbridge and Sterigere Sts., Norristown, Pa.
Filed Oct. 28, 1959, Ser. No. 849,331
3 Claims. (Cl. 29—191.6)

The invention relates to insulating material and apparatus for the production thereof. In particular, the invention relates to steel wool batting usable as a sound absorbing material under conditions of high temperature and severe stresses and vibrations.

Acoustic insulation, and possibly thermal insulation also, frequently is desired in situations where the insulation would have to withstand conditions of extremely high temperature. In certain situations, for example in the dampening of high frequency sound waves, the material used must be able to withstand the forces involved. The insulation might also be required to have certain qualities of chemical resistance, for instance against solvents. Acoustic and thermal insulating products are commercially available which typically consist of organic and/or glass materials such as fiberglass and thermoplastic resins. These insulations, however, may be unusable or unsatisfactory under the mentioned conditions. It is known, for example, that the plastic resins have inherent limitations as far as high temperature application is concerned, and that glass fibers tend to disintegrate under vibration.

Industry is well acquainted with what is known as "steel wool," which has been found to have acoustic dampening properties. Steel wool also can withstand very high temperatures and is chemically resistant under certain conditions where conventional insulations are not, but it also has certain drawbacks. As known to industry steel wool comprises filaments of steel, all of which are aligned in the same direction. Therefore, conventional steel wool batting has a tendency to pull apart in the transverse direction for there is nothing holding adjacent filaments together. It is essential, however, that the batting maintain its resilience and uniform thickness and shape, and therefore this tendency is undesirable. The steel filaments in different layers, being parallel, tend to settle and nest side-by-side to reduce the thickness of the batting, which then has little resilience and does not maintain its thickness. Furthermore, as mentioned above, such batting has no resistance to being pulled apart transversely.

It is an object of the invention to provide a batting which can be used for acoustic and/or thermal insulation at high temperatures and under other conditions that conventional insulating products cannot withstand. It is a further object to provide a machine for producing such a steel wool batting.

Briefly, in accordance with a specific embodiment of the invention disclosed hereafter, a layer of steel wool, having its filaments aligned in one direction, is wrapped transversely with a second such layer in a helical fashion. At each side of this composite structure a further layer of wool is applied to result in a batting having successive layers of steel wool with their filaments arranged in different directions. Since adjacent layers of wool have their respective filaments arranged at right angles to each other this composite batting resists pressure tending to reduce its thickness and also has transverse as well as longitudinal strength.

Figure 2:
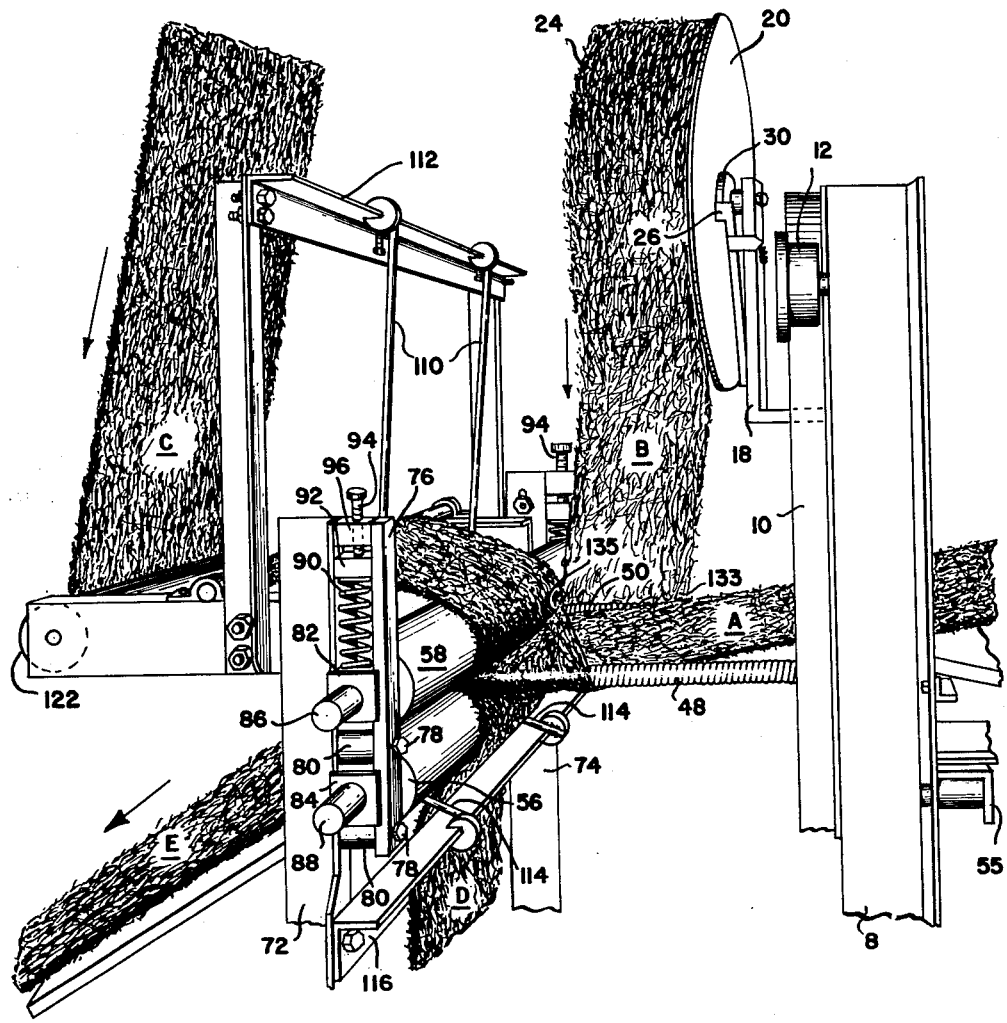
Figure 3:
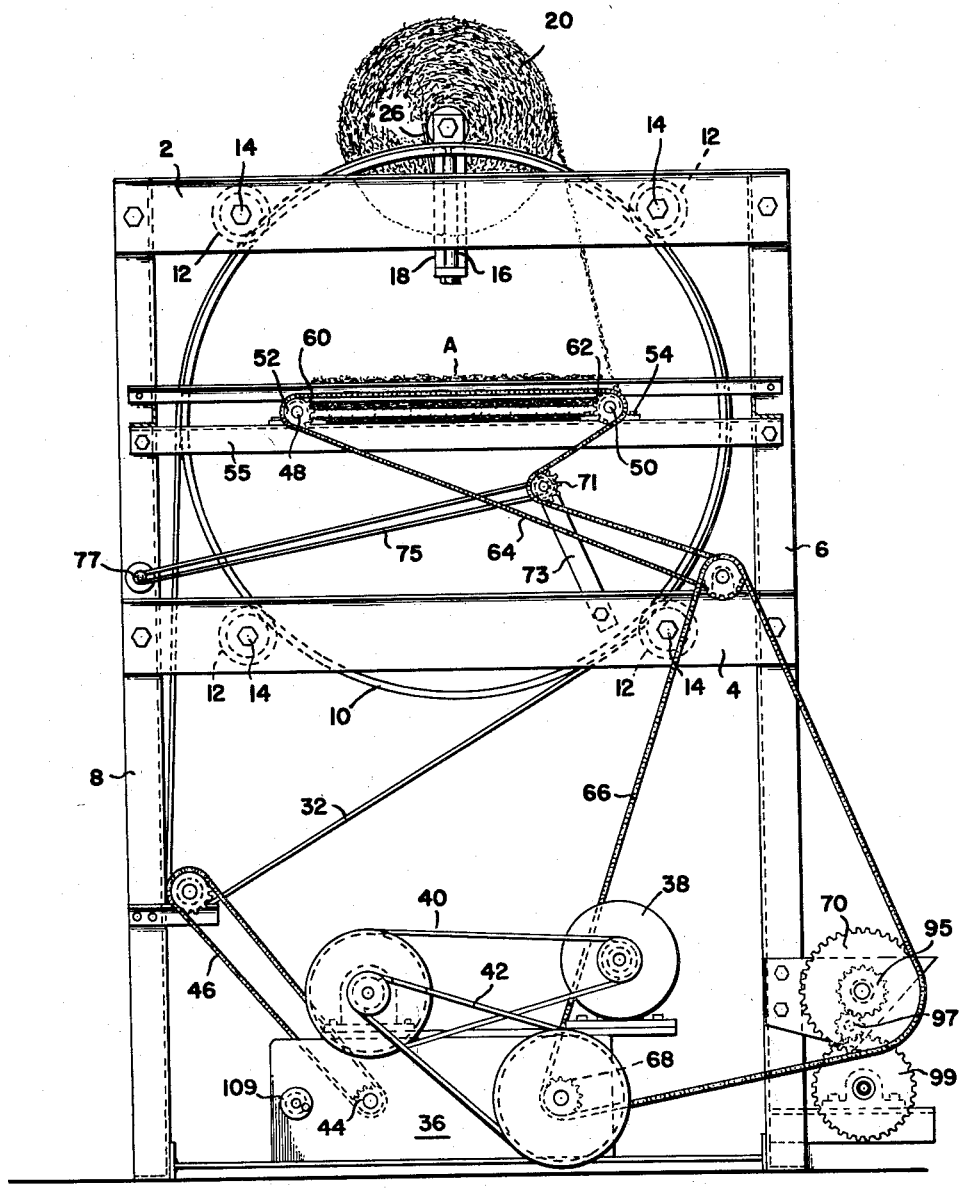
Figure 4:
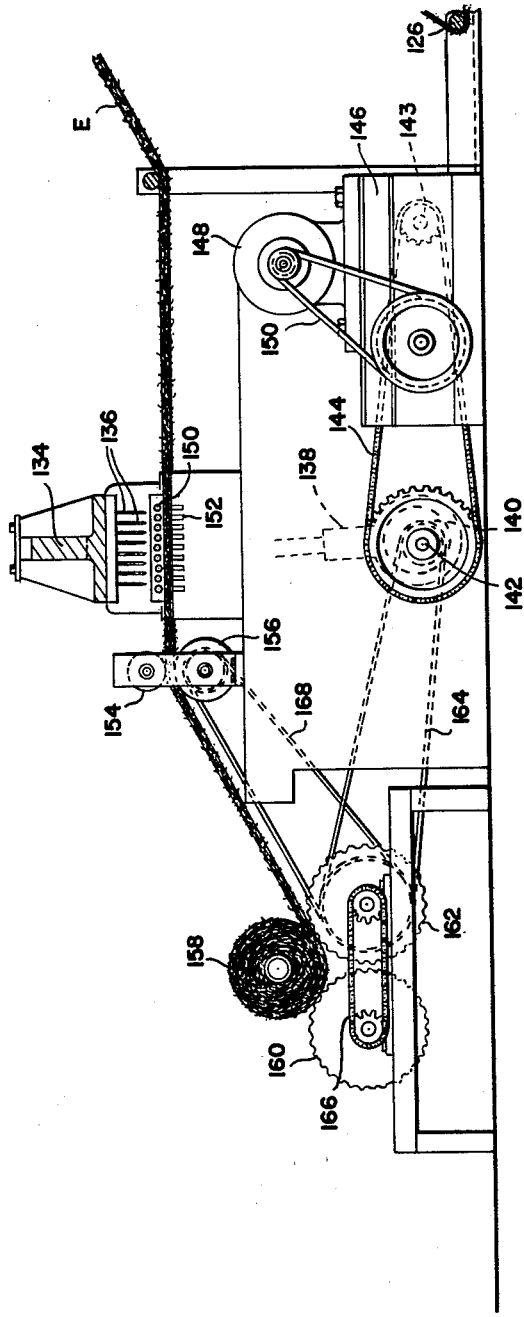
Figure 5:
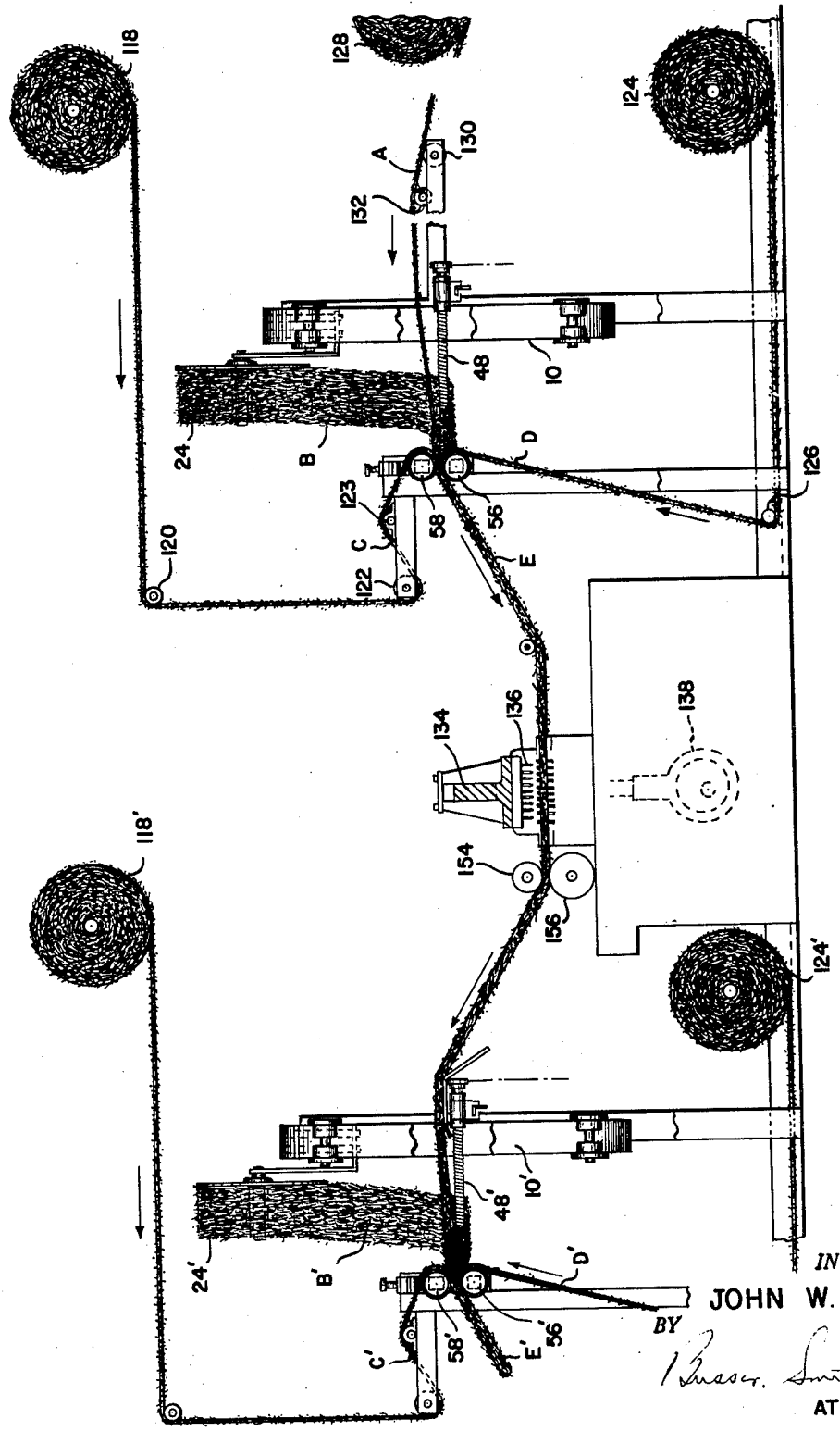

Further objects and advantages will become apparent from the following description taken in conjunction with the drawings in which:

FIGURE 1 is an elevation of the section of the machine for producing a composite steel wool blanket;
FIGURE 2 is a perspective view of part of the structure shown in FIGURE 1;
FIGURE 3 is an end view taken on line 3—3 of FIGURE 1;
FIGURE 4 is an elevation in continuation to the left of FIGURE 1 and illustrates, partly schematically, the needling operation following the operation shown in FIGURE 1; and
FIGURE 5 is a schematic illustration of an arrangement wherein a line of similar machines is provided to successively build up a thick composite steel wool blanket.

Referring to FIGURES 1 and 3, a pair of horizontal structural members 2 and 4 are supported by upright structural members 6 and 8. A drum 10 is rotatably supported and confined by flanged bearings 12, which turn on pins 14 mounted on members 2 and 4. A bracket 18 is rigidly connected to drum 10 by means of heavy rods 16, only one of which can be seen in FIGURE 3, and pivotally mount a disc 20 having a spindle 22 for supporting a reel 24 of steel wool. A friction brake for retarding the rotation of disc 20 comprises a shoe 26 pivoted on bracket 18 and having a spring 28 urging it against a collar 30 welded to disc 20. A pair of V belts 32 are passed around drum 10 in frictional engagement therewith and are driven by a sprocket 34, and it will be noted that bearings 12 are split to accommodate belts 32. The driving mechanism of the machine includes a variable transmission 36, to be more specifically described hereafter, and is driven by a motor 38 by means of belt and chain drives 40 and 42, respectively. Belt sprocket 34 is driven from an output sprocket 44 of transmission 36 by chain drive 46.

A pair of helically threaded members, hereafter referred to as "screws" 48 and 50, are cantilevered from bearing blocks 52 and 54 mounted on a cross-member 55. Screws 48 and 50 are rotatably mounted but axially restrained in blocks 52 and 54, it being understood that the threads of the screws do not extend to the ends thereof engaged by blocks 52 and 54, and terminate at their other ends just short of a pair of rolls 56 and 58 to be discussed more fully hereafter. Screws 48 and 50 are right-handed and are driven in the clockwise direction as viewed in FIGURE 3 by a pair of chain sprockets 52 and 56, respectively. Sprockets 60 and 62 are driven by chain drives 64 and 66, the latter passing around an output sprocket 68 of the variable transmission 36 and a sprocket 70. Tensioning of chain drive 64 is effected by a sprocket 71 carried by a pivotally mounted lever 73, which is urged to the left in FIGURE 3 by a spring band 75 anchored to upright member 8 by a pin 77.

Referring to FIGURE 2, a pair of upright structural members 72 and 74 are provided to mount the previously mentioned rolls 56 and 58. At each end the mounting of rolls 56 and 58 comprises a bar 76 secured to the member 72 or 74 by bolts 78 and spacers 80, this bar 76 serving to define with the adjacent upright member a holder for bearing blocks 82 and 84 for arboring the shafts 86 and 88, respectively, of rolls 58 and 56. A coil spring 90 engages bearing block 82 to force roll 58 against roll 56, and is bottomed against a block 92 which is adjustable by a bolt 94 threaded into a fixed spacer 96. The sprocket 70 driven from the transmission output sprocket 68, previously mentioned, drives through a gear train 95, 97, 99 a motion transmitting shaft 100. Bevel pinion 102 on shaft 100 meshes with a ring gear 104 which operates a chain drive 106 passing over a sprocket 108 mounted on upright member 74. At the end of rolls 56 and 58 opposite the end visible in FIGURES 1 and 2 the shafts 86 and 88 are provided with sprockets registering with chain drive 106, the connection being arranged so that rolls 56 and 58 are driven in opposite directions to drive a web therebetween to the left as viewed in FIGURE 1. Reviewing the driving mechanism of the machine it will be apparent that screws 48 and 50 are driven from output sprocket 44 of the variable transmission 36 while drum 10 and rolls 56 and 58 are driven from output sprocket 68. The transmission 36, as previously inferred, is of a special type wherein by a control knob 109 the driving ratio of sprockets 44 and 68 may be varied. Therefore, the synchronism of screws 48 and 50 with the rotation of drum 10 and rolls 56 and 58 may be adjusted to achieve the optimum in the machine operation described hereinafter.

Rods 110 are adjustably supported from a frame member 112 and are directed downwardly to act as guides for a width of steel wool batting, and similar rods 114 are adjustably supported by and are directed upwardly from a transverse frame member 116.

The steel wool that goes into the making of a composite blanket according to the invention is supplied on prewound reels and comprises a great number of steel filaments arranged in parallelism and having indeterminate length. Although for insulation purposes the wool preferably is composed of stainless steel, it will be apparent that for special applications various metals and alloys may be used. The steel wool generally is produced by a continuous process of shaving wire and collecting the shaved filaments from a plurality of cutters prior to winding on a reel. It should be apparent that in this raw state the wool has the properties of typical steel wool, namely, that it has poor resilience and a lack of transverse strength. Four layers, A, B, C, and D, of steel filament are involved in the making of a composite blanket E. The inner layer A is fed, as shown in FIGURE 2, between the screws 48 and 50. A wrapping layer B is unwound from the reel 24 mounted on disc 20. The steel wool overlays C and D are introduced between guide rods 110 and 114, respectively, and over rolls 56 and 58. The reels from which overlays C and D are drawn are not shown in FIGURES 1 to 3 but referring to FIGURE 5, which will be discussed further hereafter, it will be seen that a supply of overlay C is provided by a reel 118. After leaving reel 118 the overlay C is guided by rolls 120, 122 and 123. Overlay D is supplied from a reel 124 and guided by roll 126 to the roll 56. Similarly, the inner layer A is supplied from a reel 128 and guided by rolls 130 and 132. It will be understood that reels 118, 124 and 128 may be rotatably mounted by any suitable arrangement of structural framing. It will also be understood that layer A, for example, need not be supplied from a single reel such as 128, but that a number of reels may be mounted in complementary fashion to make up the desired width of steel wool.

It will be apparent that the rate at which layer A and overlays C and D are drawn from their respective reels 128, 118 and 124 is determined by the speed of rolls 56 and 58. The width of wrapping B need not have any specific dimension with respect to the width of layer A or overlays C and D. Assuming, however, that a specific width of wrapping B is to be used, the rotation of drum 10, carrying reel 24, is synchronized so that it will make one complete revolution in the time that a length of layer A equal to the width of wrapping B is fed by rolls 56 and 58. The rotation of screws 48 and 50 is set so that as reel 24 makes one trip around them they will feed wrapping B in engagement therewith a distance equal to its width, that is the width of wrapping B. The drum 10 rotates counterclockwise as viewed in FIGURE 3. As viewed in FIGURE 2 the reel 24 moves toward the viewer and at the instant of operation shown therein a portion of wrapping B is being draped around screw 50. In the time that it takes reel 24 to orbit once around screws 48 and 50, the screw 50 will by its rotation have fed the part of wrapping B indicated at 133 to the point indicated at 135, thus leaving screw 50 free to take on a further portion of wrapping B. Screw 48 is identical with and rotates at the same speed as screw 50 and the operation of the two screws 48 and 50 is the same.

It is obviously desirable that the edge of each successive turn of wrapping B abut the edge of the preceding turn. However, it will be apparent that if for some reason the wrapping B supplied on reel 24 is narrower than intended there will be gaps between successive turns. Therefore, the adjustment of variable transmission 36 by knob 109 to vary the speed ratio of sprockets 44 and 68 has been provided. The rotational speed of drum 10 with respect to screws 48 and 50 and rolls 56 and 58 may thereby be increased, in the event that gaps between turns of wrapping B appear, and decreased in the event, that the turns overlap slightly.

The operation of the part of the machine described thus far with reference to FIGURES 1 to 3 should be evident from the preceding description, but will be reviewed briefly. The inner layer A is supplied from reel 128 and drawn between screws 48 and 50 by rolls 56 and 58. Drum 10 rotates, carrying reel 24 in an orbit around screws 48 and 50, thereby paying out the steel wool wrapping B and wrapping it around screws 48 and 50 and inner layer A. The screws 48 and 50 advance the wrapping B a distance equal to its width in the course of one complete revolution of drum 10. Therefore, wrapping B is wound in a helix about the inner layer A. As layer A, with wrapping B wound around it, advances it passes between rolls 56 and 58, at which stage overlays C and D of steel wool are introduced and drawn with wrapping B and layer A between rolls 56 and 58. A composite blanket E has then been produced.

The layer A after it has been covered, by wrapping B, may be satisfactory for some applications, that is, without the addition of overlays C and D. It will be appreciated that even without overlays C and D the wrapping B would be firmly pressed into a flattened web form about the layer A by means of the rolls 56 and 58. However, the application of overlays C and D results in a finished blanket E having a more uniform surface and greater strength, thickness and resilience.

The description will now proceed to FIGURE 4, which illustrates apparatus for performing what is generally known as a "needling" operation. Such apparatus generally is conventional and, therefore, has not been illustrated with great specificity. In the process of needling a plurality of barbed needles reciprocates rapidly back and forth through a blanket of steel wool and displace the fibers thereof so that then intermingle and form a tightly intertwined structure. A beam 134 carries an array of the barbed needles 136 and is adapted to be reciprocated by a crank 138 journalled on an eccentric 140. Eccentric 140 is mounted on a shaft 142 driven from the output sprocket 143 of a variable transmission 146 by belt-drive 144, the transmission 146 being driven by a motor 148 through belt-drive 150. Subsequent to leaving rolls 56 and 58, composite blanket E passes between transverse rods 150 and 152 and under reciprocating needles 136. Thence it passes between a heavily weighted roll 154 and a driven roll 156, to be then wound into a roll 158. The latter is effected by means of drums 160 and 162, the drum 162 being driven by belt-drive 164 from the shaft 142. Drum 160 is synchronized with drum 162 by chain-drive 166 and roll 156 is driven from drum 162 by belt-drive 168.

It will be noted that transmission 146 is of the variable type, which means that the speed of the output sprocket 143 may be varied. The purpose of this provision is to synchronize the operations of rolls 154 and 156 and drums 160 and 162 with the operations of drum 10, screws 48 and 50 and rolls 56 and 58. Thus winding of the blanket E into roll 158 is effected at the same rate as that at which blanket E is fed from the wrapping operation.

It is not necessary that the composite blanket E be subjected to a needling operation as in the foregoing description, although it gives rise to an unusually strong and resilient product. The displacement of filaments from one layer to another results in an intermeshing of layers A, B, C and D and prevents the shifting of these layers with respect to each other. The needling, for example, insures that the helical winding of wrapping B about layer A is not disturbed by shifting between the layers.

A highly novel insulation may be produced by impregnating the composite blanket E, either needled or unneedled, with silicone rubber or other material capable of withstanding the conditions under which the insulation is to be used. Silicone rubber, however, is particularly advantageous in that it maintains its elastic properties within a range of very low to very high temperatures. Silicone rubber also is noted for its good resistance to oils and solvents, and to acid, alkali and salt solutions. The steel wool blanket may be thoroughly impregnated with the silicone rubber or, alternatively, the silicone rubber may be used merely to provide an outer coating on the blanket. Ordinarily, typical acoustic and thermal insulation materials by themselves do not have great strength and it is unlikely, therefore, that common steel wool—with all the filaments aligned—would display any improved resilience or strength when impregnated with such materials. By comparison, however, according to the invention, wherein the filaments of different layers are aligned at right angles to each other, the composite blanket may be impregnated with materials having very poor qualities of strength, bonding, etc., since the blanket itself is sufficient to provide the requisite resilience and strength.

The thickness of the composite blanket E will depend upon the respective thicknesses of the constituent layers A, B, C and D, and with this in mind the thickness of the blanket E may be varied accordingly. After needling the blanket E may if desired be used as the basis for a further wrapping operation as will be evident from FIGURE 5. As illustrated in FIGURE 5, after passing between rolls 154 and 156, previously mentioned, blanket E may be fed to a second machine—identical in all respects with the machine above described—wherein certain major elements have been identified by primed (') reference numerals. It will be understood that the primed reference numerals at the left-hand side of FIGURE 5 identify machine elements which are identical with the machine elements identified by corresponding reference numerals in FIGURES 1 to 4 and need not, therefore, be further described. The blanket E passes between a pair of screws, one of which is indicated at 48' in FIGURE 5, and is there wrapped with a wrapping B' supplied from a reel 24'. In this respect it will be seen that blanket E is in effect a substitute for the layer A introduced in the first wrapping operation. Overlays C' and D' are introduced over rolls 56' and 58' to result in a second composite blanket E' similar to blanket E except that it is thicker. Any number of machines, each similar to the machine shown in FIGURES 1 to 4, may be arranged in series to collectively build up a very thick steel wool blanket. The needling operation between successive machines may be eliminated and relegated to the last step in the production of a blanket of given thickness. Also, the blanket E, E', etc. may be fed directly from the machine into a plant for impregnating or treating the blanket with a material such as silicone rubber as discussed above.

Various departures from the specifically disclosed embodiments of the invention may be made without departing from the scope of the invention as defined by the following claims:

I claim:

1. A metallic wool blanket comprising a flat inner layer of filaments running in substantially the same direction, a wrapping helically wrapped flatly around said inner layer and comprising substantially parallel filaments, and further layers of filaments flatly overlying said wrapping, the last mentioned filaments running substantially parallel to filaments of said inner layer.

2. An insulating blanket comprising a preformed flat inner web of non-woven filamentous material having the filaments thereof extending longitudinally of said web in substantially parallel relation along the length of the web, and a wrapping comprising a preformed flat second web of non-woven filamentous material having the filaments thereof extending longitudinally of said second web substantially in parallel relation along the length of said second web, said second web being helically wrapped in its flattened condition around said inner web whereby the respective filaments of said first and second webs are transversely orientated with respect to each other.

3. An insulating blanket according to claim 2 wherein said inner web and said wrapping are made of steel wool.

References Cited in the file of this patent

UNITED STATES PATENTS

| | | |
|---|---|---|
| 1,544,546 | Baker | July 7, 1925 |
| 1,726,755 | Morris | Sept. 3, 1929 |
| 2,192,590 | Seelenbinder | Mar. 5, 1940 |
| 2,231,815 | Newman et al. | Feb. 11, 1941 |
| 2,308,568 | Rogers | Jan. 19, 1943 |
| 2,316,818 | Stybr | Apr. 20, 1943 |
| 2,373,033 | Kopplin | Apr. 3, 1945 |
| 2,434,887 | Repass et al. | Jan. 2, 1948 |
| 2,447,241 | Englund | Aug. 17, 1948 |
| 2,593,373 | Weber | Apr. 15, 1952 |
| 2,794,238 | Dildilian et al. | June 4, 1957 |